United States Patent
Sugahara et al.

(10) Patent No.: US 6,408,395 B1
(45) Date of Patent: Jun. 18, 2002

(54) POWER SAVE FUNCTION REMOTE CONTROL METHOD, INFORMATION PROCESSING APPARATUS AND STORAGE MEDIUM WHICH PERFORM CENTRAL MANAGEMENT AND CONTROL OF POWER SAVE MODE FOR PLURAL APPARATUSES

(75) Inventors: Yasuo Sugahara, Kawasaki (JP); Yumi Satomi, Reading (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/120,337

(22) Filed: Jul. 22, 1998

(30) Foreign Application Priority Data

Feb. 13, 1998 (JP) ............................................. 10-031361

(51) Int. Cl.[7] .............................................. G06F 13/00
(52) U.S. Cl. ....................... 713/310; 713/320; 713/323; 713/324; 713/340
(58) Field of Search ................................. 713/300, 310, 713/320, 323, 330, 340; 714/14; 709/202, 203, 210, 209; 710/262, 268, 267

(56) References Cited

U.S. PATENT DOCUMENTS

| | | | | |
|---|---|---|---|---|
| 5,051,720 A | * | 9/1991 | Kittirutsunetorn ........... | 340/310 |
| 5,432,946 A | * | 7/1995 | Allard et al. ................ | 713/300 |
| 5,594,426 A | * | 1/1997 | Ushijima et al. ....... | 340/825.02 |
| 5,652,892 A | * | 7/1997 | Ugajin ........................ | 713/300 |
| 5,692,197 A | * | 11/1997 | Narad et al. ................. | 713/300 |
| 5,708,820 A | * | 1/1998 | Park et al. ................... | 713/300 |
| 5,742,833 A | * | 4/1998 | Dea et al. .................... | 713/323 |
| 5,809,223 A | * | 9/1998 | Lee et al. ....................... | 714/2 |
| 5,892,959 A | * | 4/1999 | Fung ........................... | 713/340 |
| 5,900,026 A | * | 5/1999 | Ryu ............................ | 713/320 |
| 5,905,900 A | * | 5/1999 | Combs et al. ............... | 713/320 |
| 5,937,201 A | * | 8/1999 | Matsushita et al. ......... | 713/320 |
| 5,938,771 A | * | 8/1999 | Williams et al. ............ | 713/310 |
| 5,968,116 A | * | 10/1999 | Day, II et al. ............... | 709/202 |
| 5,983,353 A | * | 11/1999 | McHann ...................... | 713/310 |
| 6,049,885 A | * | 4/2000 | Gibson et al. ............... | 713/324 |
| 6,105,138 A | * | 8/2000 | Arakawa et al. ............. | 713/300 |
| 6,122,746 A | * | 9/2000 | Nouri et al. ................. | 713/310 |
| 6,134,668 A | * | 10/2000 | Sheikh et al. ............... | 713/310 |
| 6,138,241 A | * | 10/2000 | Eckel et al. ................. | 713/300 |
| 6,163,849 A | * | 12/2000 | Nouri et al. ................. | 713/324 |
| 6,341,354 B1 | * | 1/2002 | Lee ............................. | 713/324 |

FOREIGN PATENT DOCUMENTS

| | | |
|---|---|---|
| JP | 5-73448 | 3/1993 |
| JP | 5-189094 | 7/1993 |
| JP | 5-297986 | 11/1993 |
| JP | 7-295689 | 11/1995 |
| JP | 07-295689 | 11/1995 |
| JP | 8-314588 | 11/1996 |
| JP | 9-218726 | 8/1997 |
| JP | 09-218726 | 8/1997 |
| JP | 09-305270 | 11/1997 |
| JP | 9-305270 | 11/1997 |

OTHER PUBLICATIONS

Office Action (Japanese language) issued in Japanese patent application No. 10–031361.

* cited by examiner

*Primary Examiner*—Peter Wong
*Assistant Examiner*—Raymond N Phan
(74) *Attorney, Agent, or Firm*—Staas & Halsey LLP

(57) ABSTRACT

A power save function remote control method for a system having a first information processing apparatus and at least one second information processing apparatus which are coupled via a network, includes a first step outputting a control signal which instructs a power save mode from the first information processing apparatus to the network, and a second step switching the second information processing apparatus to the power save mode in response to the control signal when a predetermined condition is satisfied in the second information processing apparatus.

48 Claims, 16 Drawing Sheets

FIG. 7

| CLIENT ID | GROUP | MANAGEMENT LEVEL |
|---|---|---|
| 0 0 1 | A | A |
| 0 0 2 | B | B |
| 0 0 3 | A | C |
| 0 0 4 | C | C |
| 0 0 5 | B | C |

FIG. 8

| MANAGEMENT LEVEL | REMOTE MANAGEMENT | STATUS REFERENCE |
|---|---|---|
| A | POSSIBLE | POSSIBLE |
| B | NOT POSSIBLE | POSSIBLE |
| C | NOT POSSIBLE | NOT POSSIBLE |

FIG. 9

| GROUP | STATE TRANSITION TABLE | | | | | | |
|---|---|---|---|---|---|---|---|
| | MON | TUE | WED | THU | FRI | SAT | SUN |
| A | a | a | a | a | a | b | b |
| B | c | d | c | d | c | d | b |
| C | b | a | a | a | a | a | a |

FIG. 10

| PATTERN | 00:00 | ... | 09:00 | ... | 12:00 | 13:00 | ... | 17:00 | ... | 21:00 | 22:00 | 23:00 |
|---|---|---|---|---|---|---|---|---|---|---|---|---|
| a | OFF | | ON | | STOP | RESTORE | | OFF | | | | |
| b | OFF | | | | | | | OFF | | | | |
| c | OFF | | | | | | | ON | | | STOP | RESTORE |
| d | ON | | | | | | | OFF | | | | |

FIG. 11

CLIENT ID : 0 0 1

| DATE | TIME | CONTROL SIGNAL | STATUS | CAUSE |
|---|---|---|---|---|
| 1997.09.30 | 09 : 00 | ON | ON | — |
| 1997.09.30 | 12 : 00 | STOP | ON | BUSY |
| 1997.09.30 | 12 : 10 | STOP | STOP | — |
| 1997.09.30 | 13 : 00 | RESTORE | ON | — |
| 1997.09.30 | 15 : 00 | MANUAL STOP | STOP | — |

CLIENT ID : 0 0 2

| DATE | TIME | CONTROL SIGNAL | STATUS | CAUSE |
|---|---|---|---|---|
| 1997.09.30 | 13 : 00 | ON | ON | — |
| 1997.09.30 | 21 : 00 | STOP | STOP | — |
| 1997.09.30 | 21 : 30 | MANUAL RESTORE | ON | — |

POWER SAVE FUNCTION REMOTE CONTROL METHOD, INFORMATION PROCESSING APPARATUS AND STORAGE MEDIUM WHICH PERFORM CENTRAL MANAGEMENT AND CONTROL OF POWER SAVE MODE FOR PLURAL APPARATUSES

BACKGROUND OF THE INVENTION

The present invention generally relates to power save function remote control methods, information processing apparatuses and storage mediums, and more particularly to a power save function remote control method for providing an efficient power save service in a system which includes a plurality of information processing apparatuses coupled via a network, an information processing apparatus which employs such a power save function remote control method, and a computer readable storage medium which stores a program for controlling such an information processing apparatus.

Recently, due to the popularization of computer systems, the large power consumption of the computer systems is becoming a problem. Particularly in a computer system having a large number of computers which are coupled via a network, it is rare that all of the computers are constantly accessed by a user, and there are demands to efficiently utilize the computer system from the point of power consumption.

In the case of the conventional computers, the user of each computer sets and manages a power save mode of the computer. In addition, the switching of an operation mode to the power save mode is limited to the case where the user makes no access to the computer for a predetermined time, and to the case where the user manually instructs the power save mode.

The power save mode temporarily stops the supply of power to the hardware and circuits to a level such that the present processing state can be continued, when the user makes no access to the computer for a predetermined time. For example, the hardware and circuits to which the supply of power is temporarily stopped in the power save mode include a display, hard disk drive and the like. The operation mode of the computer is restored from the power save mode to a normal mode by detecting an operation of a keyboard, a mouse or the like coupled to the computer. The power save mode, the restoration from the power save mode to the normal mode, and methods of controlling the power save mode and the restoration are known in the field of computers such as personal computers and work stations.

Conventionally, the user of each computer sets and manages the power save mode of each computer. For this reason, there was a problem in that information related to the setting of the power save mode, the state of use and the like of each computer cannot be obtained by other computers. In addition, because the switching of the operation mode of each computer to the power save mode is limited to the case where the user makes no access to the computer for a predetermined time and the case where the user manually sets the operation mode to the power save mode, there was a problem in that it is difficult to efficiently utilize the computer system from the point of view of the power consumption.

SUMMARY OF THE INVENTION

Accordingly, it is a general object of the present invention to provide a novel and useful power save function remote control method, information processing apparatus and storage medium, in which the problems described above are eliminated.

Another and more specific object of the present invention to provide a power save function remote control method, an information processing apparatus and a storage medium which enable remote control of the power save mode by centrally managing and controlling the setting and management of the power save mode of each of the information processing apparatuses, so that it is possible to efficiently utilize an information processing system from the point of view of the power consumption.

Still another object of the present invention is to provide a power save function remote control method for a system having a first information processing apparatus and at least one second information processing apparatus which are coupled via a network, comprising a first step outputting a control signal which instructs a power save mode from the first information processing apparatus to the network, and a second step switching the second information processing apparatus to the power save mode in response to the control signal when a predetermined condition is satisfied in the second information processing apparatus. According to the power save function remote control method of the present invention, it is possible to remotely control the power save mode by centrally managing and controlling the setting and management of the power save mode of each second information processing apparatus, so that the information processing system can be utilized efficiently from the point of the power consumption.

A further object of the present invention is to provide an information processing apparatus connectable to a network, comprising a power save controller outputting-a control signal which instructs a power save mode to the network, and a manager inputting, via the-network, status information related to states of other information processing apparatuses including whether or not the other information processing switched to a power save mode, and centrally managing the status information related to the other information processing apparatuses. According to the information processing apparatus of the present invention, it is possible to remotely control the power save mode by centrally managing and controlling the setting and management of the power save mode of other information processing apparatuses, so that it is possible to efficiently utilize the information processing system from the point of view of the power consumption.

Another object of the present invention is to provide an information processing apparatus connectable to a network, comprising a power save mode controller switching an operation mode thereof to a power save mode in response to a control signal input via the network when a predetermined condition is satisfied, and a status output part outputting, to the network, status information related to a state of the information processing apparatus including whether or not the operation mode is switched to the power save mode. According to the information processing apparatus of the present invention, it is possible to remotely control the power save mode by centrally managing and controlling the setting and management of the power save mode of the information processing apparatus from the other information processing apparatuses, so that it is possible to efficiently utilize the information processing system from the point of view of the power consumption.

Still another object of the present invention is to provide a computer readable storage medium which stores a program for controlling an information processing apparatus coupled to a network, comprising power save control means for causing the information processing apparatus to output a control signal which instructs a power save mode to the network, and managing means for causing the information processing apparatus to input, via the network, status information related to states of other information processing apparatuses including whether or not the other information processing switched to a power save mode, and centrally managing the status information related to the other information processing apparatuses. According to the computer readable storage medium of the present invention, it is possible to remotely control the power save mode by centrally managing and controlling the setting and management of the power save mode of other information processing apparatuses, so that it is possible to efficiently utilize the information processing system from the point of view of the power consumption.

A further object of the present invention is to provide a computer readable storage medium which stores a program for controlling an information processing apparatus coupled to a network, comprising power save mode control means for causing the information processing apparatus to switch an operation mode thereof to a power save mode in response to a control signal input via the network when a predetermined condition is satisfied, and status output means for causing the information processing apparatus to output, to the network, status information related to a state of the information processing apparatus including whether or not the operation mode is switched to the power save mode. According to the computer readable storage medium of the present invention, it is possible to remotely control the power save mode by centrally managing and controlling the setting and management of the power save mode of the information processing apparatus from the other information processing apparatuses, so that it is possible to efficiently utilize the information processing system from the point of view of the power consumption.

Other objects and further features of the present invention will be apparent from the following detailed description when read in conjunction with the accompanying drawings.

BRIEF DESCRIPTION OF THE DRAWINGS

FIG. 7 is a diagram showing a client information table;

FIG. 8 is a diagram showing a management level information table;

FIG. 9 is a diagram showing a week schedule table;

FIG. 10 is a diagram showing a state transition table;

FIG. 11 is a diagram showing a client status history table;

DETAILED DESCRIPTION OF THE PREFERRED EMBODIMENTS

Figure 1:
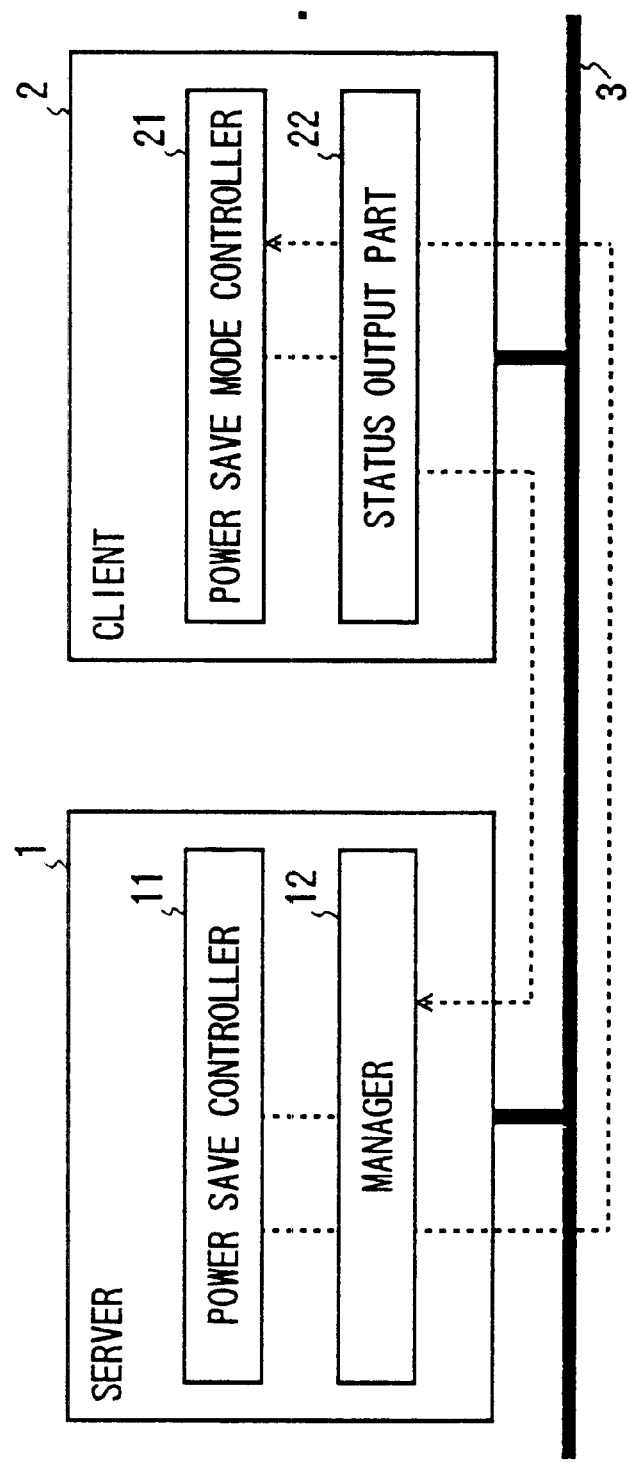
FIG. 1 is a system block diagram showing an important part of an information processing system applied with the present invention.

FIG. 1 is a system block diagram showing an important part of an information processing system applied with the present invention. In FIG. 1, the information processing system includes a first information processing apparatus 1 which is used as a server, and a plurality of second information processing apparatuses 2 (only 1 shown) which are used as clients, and these first and second information processing apparatuses 1 and 2 are coupled via a network 3. Each of the first and second information processing apparatuses 1 and 2 is made up of a general purpose computer, a personal computer or the like, for example, and a computer having a known hardware construction may be used for each of the first and second information processing apparatuses 1 and 2. The network 3 is made up of a local area network (LAN) or the like, and a known network structure can be used for the network 3.

The first information processing apparatus 1 includes a power save controller 11 which outputs to the network 3 a control signal instructing the power save mode of each of the second information processing apparatuses 2, and a manager 12 which inputs via the network 3 status information related to the state of each of the second information processing apparatuses 2, including whether or not the operation mode has switched to the power save mode, and centrally manages the status information of each of the second information processing apparatuses 2. On the other hand, the second information processing apparatus 2 includes a power save mode controller 21 which switches the operation mode to the power save mode in response to a control signal input via the network 3 when a predetermined condition is satisfied, and a status output part 22 which outputs to the network 3 status information related to the state of the second information processing apparatus 2, including whether or not the operation mode has switched to the power save mode.

The power save controller 11 can output the control signal at an arbitrary timing. For example, the power save controller 11 may be constructed to output the control signal based on a schedule which is preset with respect to each of the second information processing apparatuses 2.

Accordingly, the setting and management of the power save mode of each of the second information processing apparatuses 2 can be centrally managed and controlled by the first information processing apparatus 1, so that the power save mode can be remotely controlled and the information processing system can be efficiently utilized from the point of view of the power consumption.

Figure 2:
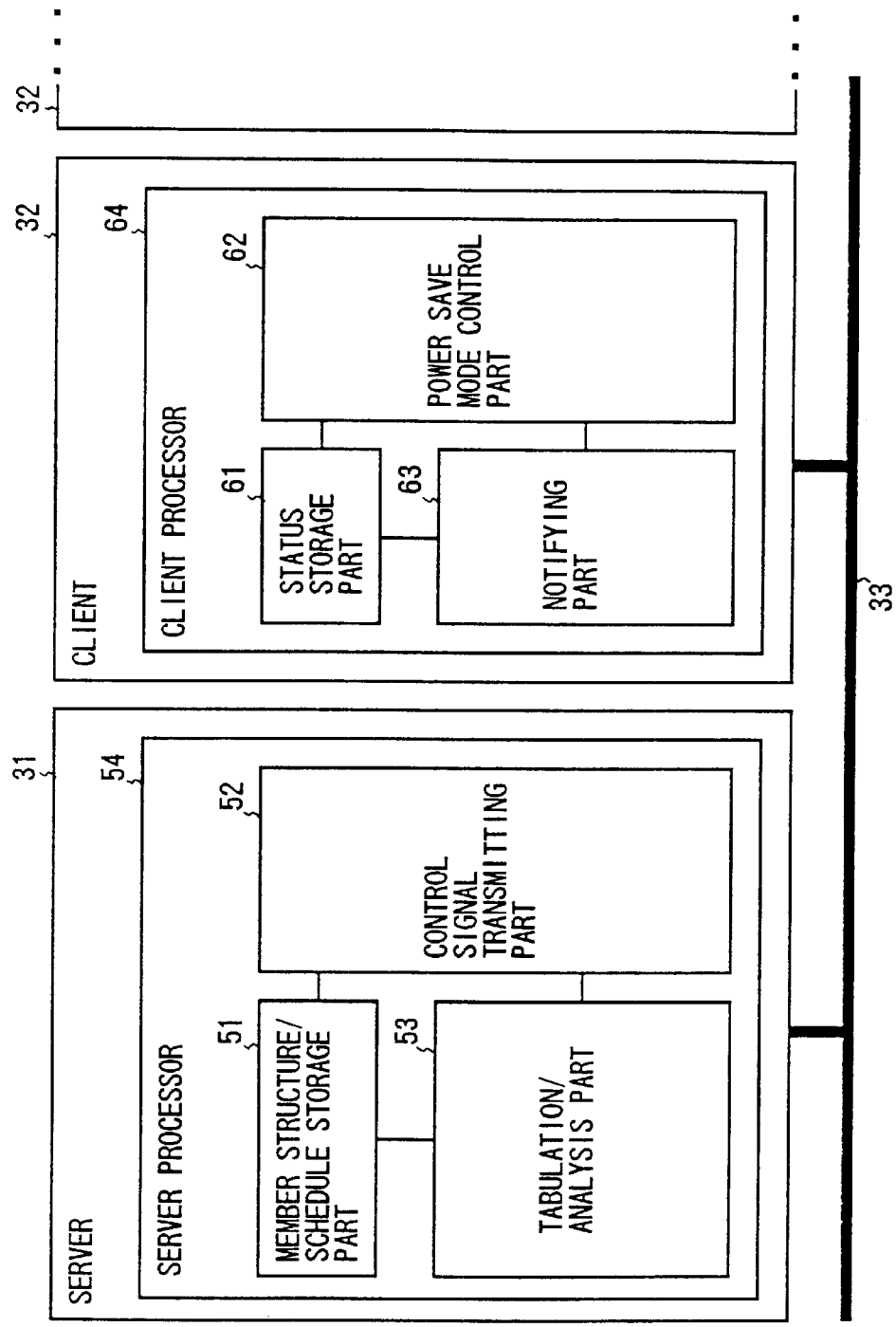
FIG. 2 is a system block diagram showing the general construction of a computer system applied with a first embodiment of-a power save function remote control method according to the present invention.

FIG. 2 is a system block diagram showing the general construction of a computer system applied with a first embodiment of a power save function remote control method according to the present invention.

Figure 3:
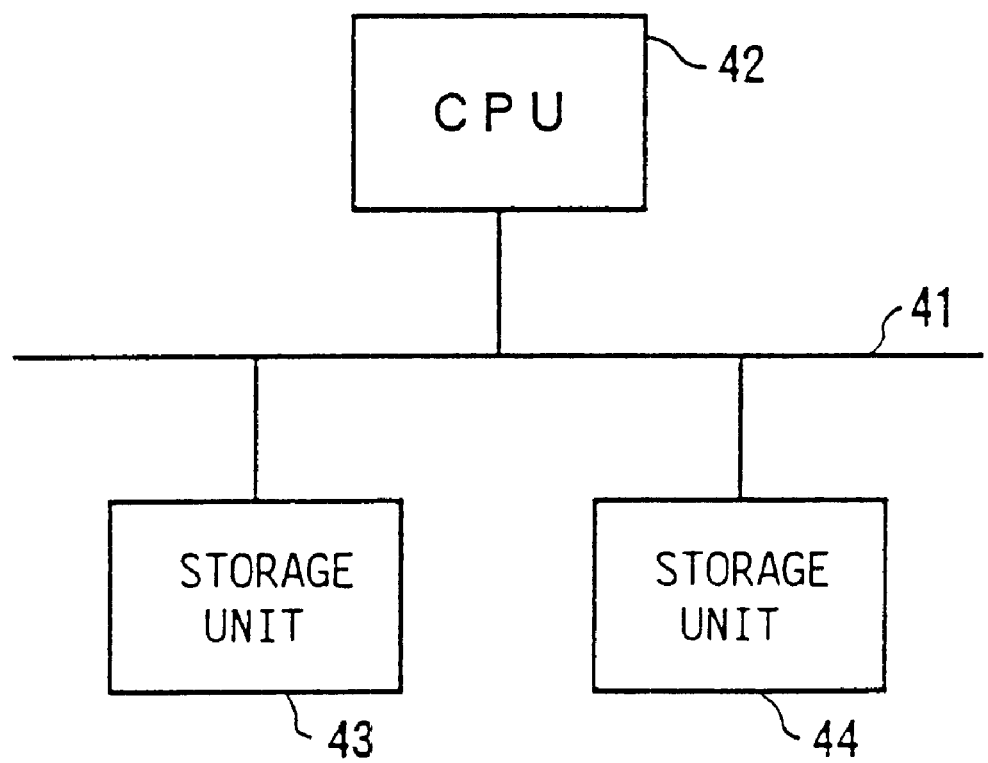
FIG. 3 is a system block diagram showing the general construction of a personal computer.

FIG. 3 is a system block diagram showing the general construction of a personal computer. In this first embodiment of the power save function remote control method, the present invention is applied to the computer system, and a first embodiment of an information processing apparatus according to the present invention and a first embodiment of a storage medium according to the present invention are employed.

In FIG. 2, the computer system includes a plurality of personal computers 31 and 32 which are coupled via a network 33. The personal computer 31 is used as a server, and the personal computers 32 are used as clients. Each of the personal computers 31 and 32 has a known hardware construction shown in FIG. 3, and includes a central processing unit (CPU) 42 and storage units 43 and 44 which are coupled via a bus 41. The storage unit 43 stores programs which are executed by the CPU 42, and the storage unit 44 stores intermediate data of computation processes carried out by the CPU 42, a schedule which will be described later, and the like.

The storage units 43 and 44 may be made of a semiconductor memory device such as a RAM, ROM and EEPROM, a recording medium such as a magnetic disk, optical disk and magneto-optic disk, a card shaped recording medium, and the like. The storage medium according to the present invention is formed by the storage unit 43 and/or the storage unit 44, and is not limited to a specific type of storage unit as long as the medium is capable of storing a program and is computer readable. The first embodiment of the storage medium is formed by the storage unit 43 which is made of a CD-ROM, for example.

The personal computer 31 has a software construction shown in FIG. 2 which is made up of a server processor 54 including a member structure/schedule storage part 51, a control signal transmission part 52, and a tabulation/analysis part 53. The member structure/schedule storage part 51 is formed by the storage unit 44 shown in FIG. 3, for example, and stores a member structure related to the personal computers 32 coupled to the network 33, a schedule and the like. The functions of the control signal transmitting part 52 and the tabulation/analysis part 53 are realized by executing corresponding programs by the CPU 42. The control signal transmitting part 52 transmits a power save control signal depending on the schedule stored in the member structure/schedule storage part 51 or, depending on an external request. The tabulation/analysis part 53 tabulates/analyzes status information returned from the personal computers 32.

On the other hand, each personal computer 32 has a software construction shown in FIG. 2 which is made up of a client processor 64 including a status storage part 61, a power save mode control part 62, and a notifying part 63. The status storage part 61 is formed by the storage unit 44 shown in FIG. 3, for example, and stores the status information related to the state of the personal computer 32. The functions of the power save mode control part 62 and the notifying part 63 are realized by executing corresponding programs by the CPU 42. The power save mode control part 62 switches the operation mode to the power save mode in response to the power save control signal when a predetermined condition is satisfied. The predetermined condition relates to information indicating that the personal computer 32 is not being used by the user, and includes conditions such as no key input, modem unused, and hard disk driver not operating. The notifying part 63 reads the status information related to the state of the personal computer 32, including whether or not the operation mode has switched to the power save mode, from the status storage part 61 and outputs the read status information.

The power save mode control part 62 may be constructed to display on a screen of a display (not shown) a message indicating that the power save control signal is received and inquires whether or not the operation mode may be switched to the power save mode, when the power save mode control part 62 receives the power save control signal. In this case, when no input is made from the keyboard, mouse or the like within a predetermined time from the time when the message is displayed or, when an input confirming the switching of the operation mode to the power save mode is made by the user, such an occurrence may be used as the predetermined condition described above.

Figure 4:
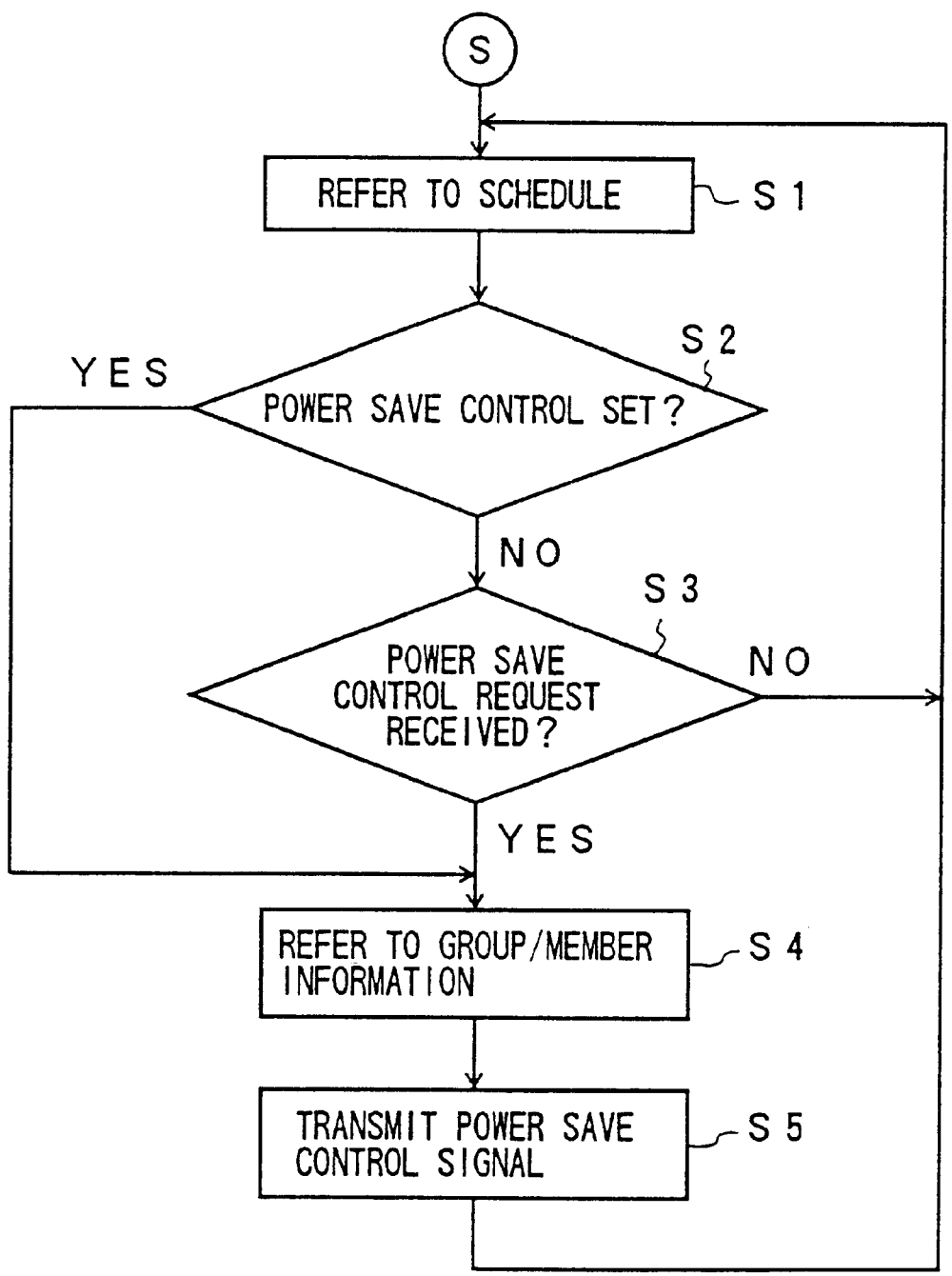
FIG. 4 is a flow chart for explaining the operation of a CPU for realizing the function of a control signal transmitting part in the first embodiment.

FIG. 4 is a flow chart for explaining the operation of the CPU 42 for realizing the function of the control signal transmitting part 52 of the personal computer 31. In FIG. 4, a step S1 makes a reference to the schedule stored in the member structure/schedule storage part 51, and a step S2 decides whether or not a personal computer 32 to be subject to the power save control is set in the schedule. If the decision result in the step S2 is YES, the process advances to a step S4 which will be described later. On the other hand, if the decision result in the step S2 is NO, a step S3 decides whether or not a power save control request is received from the outside. The process returns to the step S1 if the decision result in the step S2 is NO. On the other hand, if the decision result in the step S3 or the step S2 is YES, the step S4 makes a reference to the member structure of the personal computers 32 stored in the member structure/schedule storage part 51, and reads group/member information of the personal computers 32. A step S5 outputs to the network 33 a power save control signal with respect to the personal computer 32 with respect to which the power save control request is set, and the process returns to the step S1.

Figure 5:
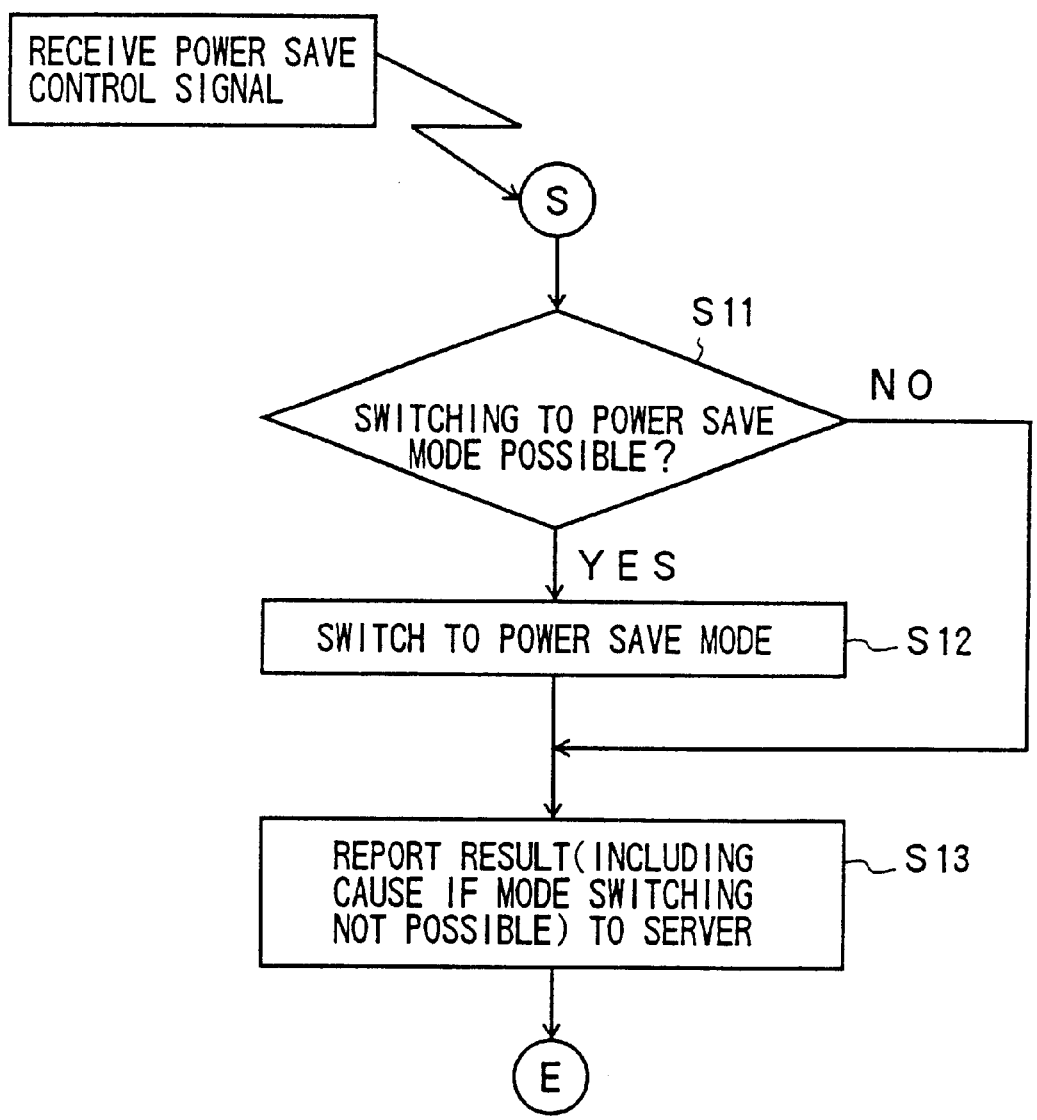
FIG. 5 is a flow chart for explaining the operation of the CPU for realizing the function of a power save mode control part in the first embodiment.

FIG. 5 is a flow chart for explaining the operation of the CPU 42 for realizing the function of the power save mode control part 62 of the personal computer 32. The process shown in FIG. 5 is started when the power save control signal with respect to the personal computer 32 is received via the network 33. A step S11 decides whether or not the operation mode of the personal computer 32 can be switched to the power save mode. The process advances to a step S13 which will be described later if the decision result in the step S11 is NO. On the other hand, if the decision result in the step S11 is YES, a step S12 switches the operation mode of the personal computer 32 to the power save mode by a known method. The step S13 stores status information in the status storage part 61, and also outputs the status information to the network 33 to return the status information to the personal computer 31, and the process ends. This status information includes the result of the power save control, that is, whether or not the operation mode is switched to the power save mode, the cause if the operation mode is not switched to the power save mode, and the state of the personal computer 32.

The cause for not switching the operation mode to the power save mode includes the key in use, the modem in use, the hard disk driver (magnetic disk drive) in operation, an input made by the user prohibiting the switching of the operation mode to the power save mode in response to the message inquiring whether or not the operation mode may be switched to the power save mode, and the like.

Figure 6:
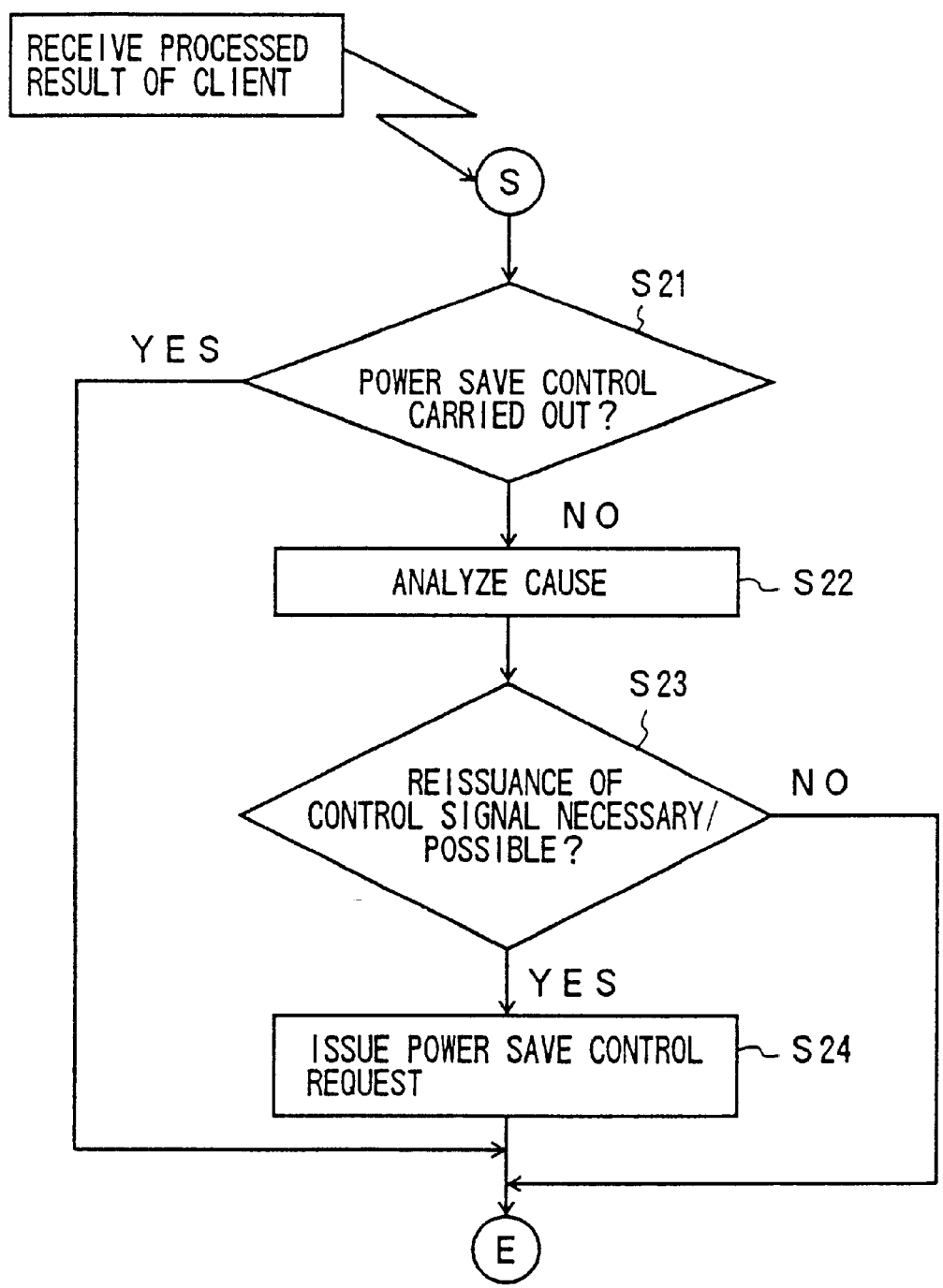
FIG. 6 is a flow chart for explaining the operation of the CPU for realizing the function of a tabulation/analysis part in the first embodiment.

FIG. 6 is a flow chart for explaining the operation of the CPU 42 for realizing the function of the tabulation/analysis part 53 of the personal computer 31. The process shown in FIG. 6 is started when the status information with respect to the personal computer 31 is received via the network 33 or, after a predetermined time elapses from the output of the power save control signal. A step S21 decides whether or not the power save control is carried out by the personal computer 32, based on the existence of received status information and the received status information. The process ends if the decision result in the step S21 is YES. On the other hand, if the decision result in the step S21 is NO, a step S22 analyzes the cause for not carrying out the power save control, based on the existence of the received status information and the received status information. A step S23 decides whether or not the reissuance of the power save control signal is necessary or, possible. The process ends if the decision result in the step S23 is NO. If the decision result in the step S23 is YES, a step S24 issues a power save control request with respect to the control signal transmitting part 52, and the process ends.

In cases where the cause of the status information indicates that the key is in use, the personal computer 32 is already in the power save mode, and the like when the step S23 decides whether or not to reissue the power save control signal, it is judged that there is no need to reissue the power save control signal. On the other hand, in a case where the cause of the status information indicates that the hard disk drive is operating, for example, it is judged that there is a need to reissue the power save control signal. In addition, if the status information is not received within a predetermined time from the output of the power save control signal, it may be impossible to receive the power save control signal due to reasons such as the power supply of the personal computer 32 being in an OFF state, and thus, it is judged in this case that there is no need to reissue the power save control signal.

Next, a description will be given of a second embodiment of the power save function remote control method according to the present invention. The general construction of the computer system to which his second embodiment of the power save function remote control method is applied is the same as that of the first embodiment described above. In addition, the general construction of the personal computers may be the same as that shown in FIG. 3. In this second embodiment of the power save function remote control method, the present invention is applied to the computer system, and a second embodiment of the information processing apparatus according to the present invention and a second embodiment of the storage medium according to the present invention are employed.

In this embodiment, tables shown in FIGS. 7 through 11 are stored in the member structure/schedule storage part 51 of the personal computer 31. The tables shown in FIGS. 7 and 8 store information related to the member structure, and the tables shown in FIGS. 9 through 11 store information related to the schedule.

FIG. 7 shows a client information table. The client information table stores a group and a management level with respect to a client identification (ID) number which is assigned to each personal computer 32. For example, a group "A" and a management level "A" are set with respect to a personal computer 32 having a client ID number "001".

FIG. 8 shows a management level information table. The management level information table stores information indicating whether or not a remote management is possible and whether or not a reference to the status is possible, with respect to each management level. For example, information indicating that the remote management is "not possible" and that the reference to the status is "possible" is set with respect to a management level "B".

FIG. 9 shows a week schedule table. The week schedule table stores a state transition pattern depending on the day of week, with respect to each group of the personal computers 32. For example, transition patterns "b", "a", "a", "a", "a", "a" and "a" are respectively set for Monday, Tuesday, Wednesday, Thursday, Friday, Saturday and Sunday with respect to a group "C" of the personal computers 32.

FIG. 10 shows a state transition table. The state transition table stores the state of the personal computer 32 for each time band of 1 day, with respect to each state transition pattern. For example, information indicating that the power supply is to turn ON at the time 00:00 and the power supply is to turn OFF at the time 12:00 are set with respect to the state transition pattern "d".

FIG. 11 shows a client status history table. The client status history table stores the state of the power save control signal for the date and time, the status of the personal computer 32, the cause and the like, with respect to each client ID number. For example, information indicating that the power save control signal which indicates "STOP" was transmitted on Sep. 30, 1997 at a time 12:00 but the status remained in the "ON" state and the cause thereof was "BUSY" is recorded with respect to the personal computer 32 having the client ID number "001". The state of the "power save control signal" in the client status history table is "ON" to indicate that the personal computer 32 is operating in the normal mode, "STOP" to indicate that the power save mode is output based on the schedule, "RESTORE" to indicate that the operation mode is to be switched to the normal mode by the instruction of the schedule, "MANUAL STOP" to indicate that the power save mode is output manually, and "MANUAL RESTORE" to indicate that the operation mode is to be switched to the normal mode by a manual instruction. In addition, the state of the "status" in the client status history table is "ON" to indicate that the personal computer 32 is carrying out the operation in the normal mode, and "STOP" to indicate that the personal computer 32 is in the power save mode. Furthermore, the state of the "cause" in the client status history table is "BUSY" to indicate that the personal computer 32 is in use by the user and the key is in use, the modem is in use, the hard disk drive (magnetic disk drive) is operating or the like. The detailed reasons for the "BUSY" state is also stored in the client status history table, and the reasons are used when judging whether or not to reissue the power save control signal.

In this embodiment, as will be described later in conjunction with FIG. 12, the control signal transmitting part 52 periodically monitors the schedule set in the member structure/schedule storage part 51 of the personal computer 31. If a personal computer 32 set to switch the operation mode to the power save mode exists in the schedule, the power save control signal is issued with respect to this personal computer 32. On the other hand, as will be described later in conjunction with FIG. 13, the power save control signal is issued with respect to the personal computer 32 having the control signal transmitting part 52 with the power save control request when the power save control request is received from the tabulation/analysis part 53 of the personal computer 31 or a personal computer 32 having a specific managing authority.

In addition, as will be described later in conjunction with FIG. 14, the power save mode control, part 62 of the personal computer 32 decides whether or not it is actually possible to switch the operation mode to the power save mode when the power save control signal is received, and the operation mode is switched to the power save mode if possible. In addition, the notifying part 63 of the personal computer 32 notifies the result of the power save control as status information with respect to the personal computer 31.

Moreover, as will be described later in conjunction with FIG. 15, the tabulation/analysis part 53 of the personal computer 31 updates the history of each of the personal computers 32 when the status information from each of the personal computers 32. If the reissuance of the power save control signal is necessary, a power save control request is made with respect to the control signal transmitting part 52. In addition, as will be described later in conjunction with FIG. 16, when the tabulation/analysis part 53 of the personal computer 31 receives a request to make a reference to the status information from a personal computer 32 having a specific authority to make the reference, the requested status information is transmitted with respect to this personal computer 32.

Figure 12:
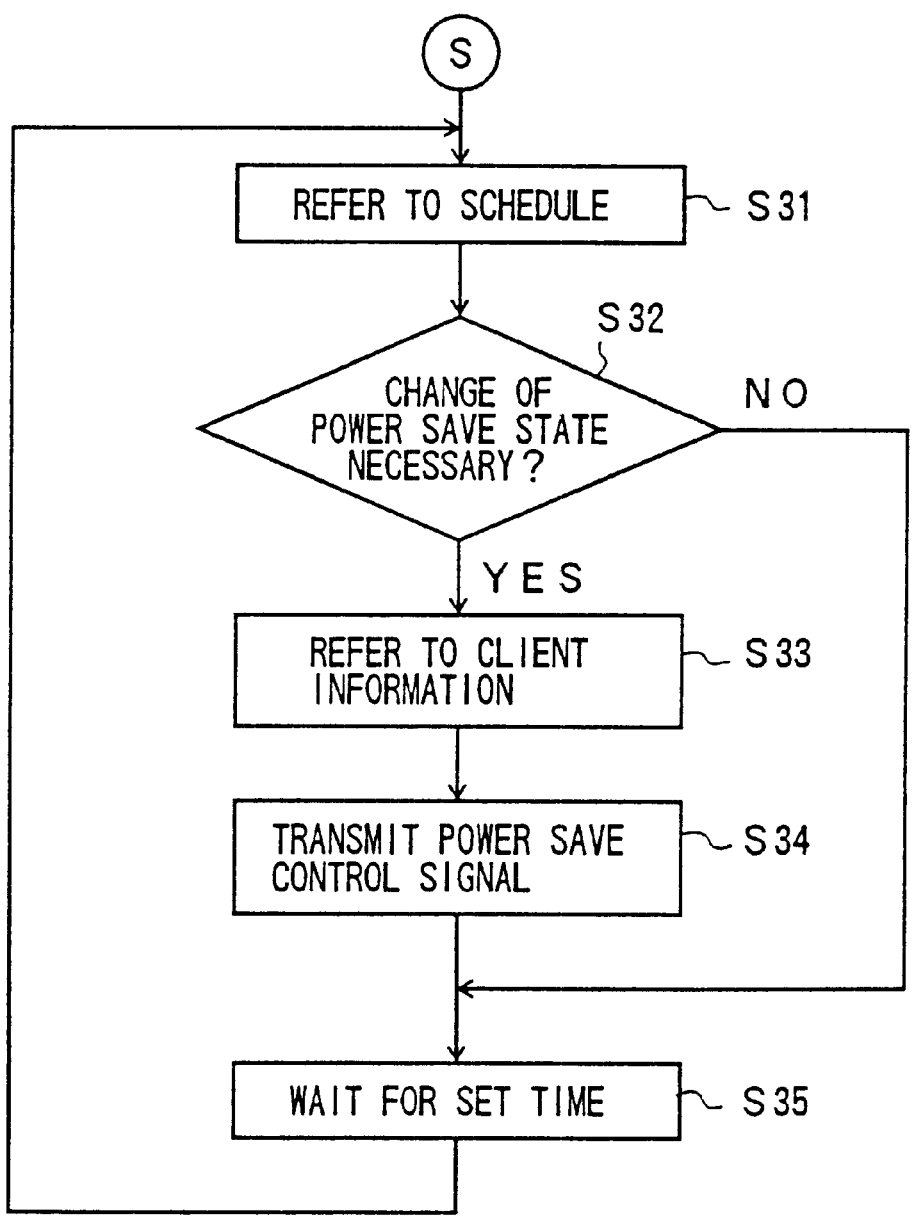
FIG. 12 is a flow chart for explaining the operation of the CPU for realizing the function of a control signal transmitting part in a second embodiment.

FIG. 12 is a flow chart for explaining the operation of the CPU 42 for realizing the function of the control signal transmitting part 52 of the personal computer 31. In FIG. 12, a step S31 makes a reference to the schedule made up of the tables shown in FIGS. 7 through 10 and stored in the member structure/schedule storage part 51. A step S32 decides whether or not a personal computer 32 which requires a change in the power save mode exists from the state transition table shown in FIG. 10 within the schedule. The process advances to a step S35 which will be described later if the decision result in the step S32 is NO. On the other hand, if the decision result in the step S32 is YES, a step S33 makes a reference to the client information (client ID number) of the client information table shown in FIG. 7 within the schedule. A step S34 outputs to the network 33 the power save control signal with respect to the personal computer 32 set with the power save control request. The step S35 waits for a predetermined time, and the process thereafter returns to the step S31.

Accordingly, the schedule is periodically monitored, and if the switching of the operation mode to the power save mode is set in the schedule, the power save control signal is automatically issued with respect to the personal computer 32 which is set to switch to the power save mode.

Figure 13:
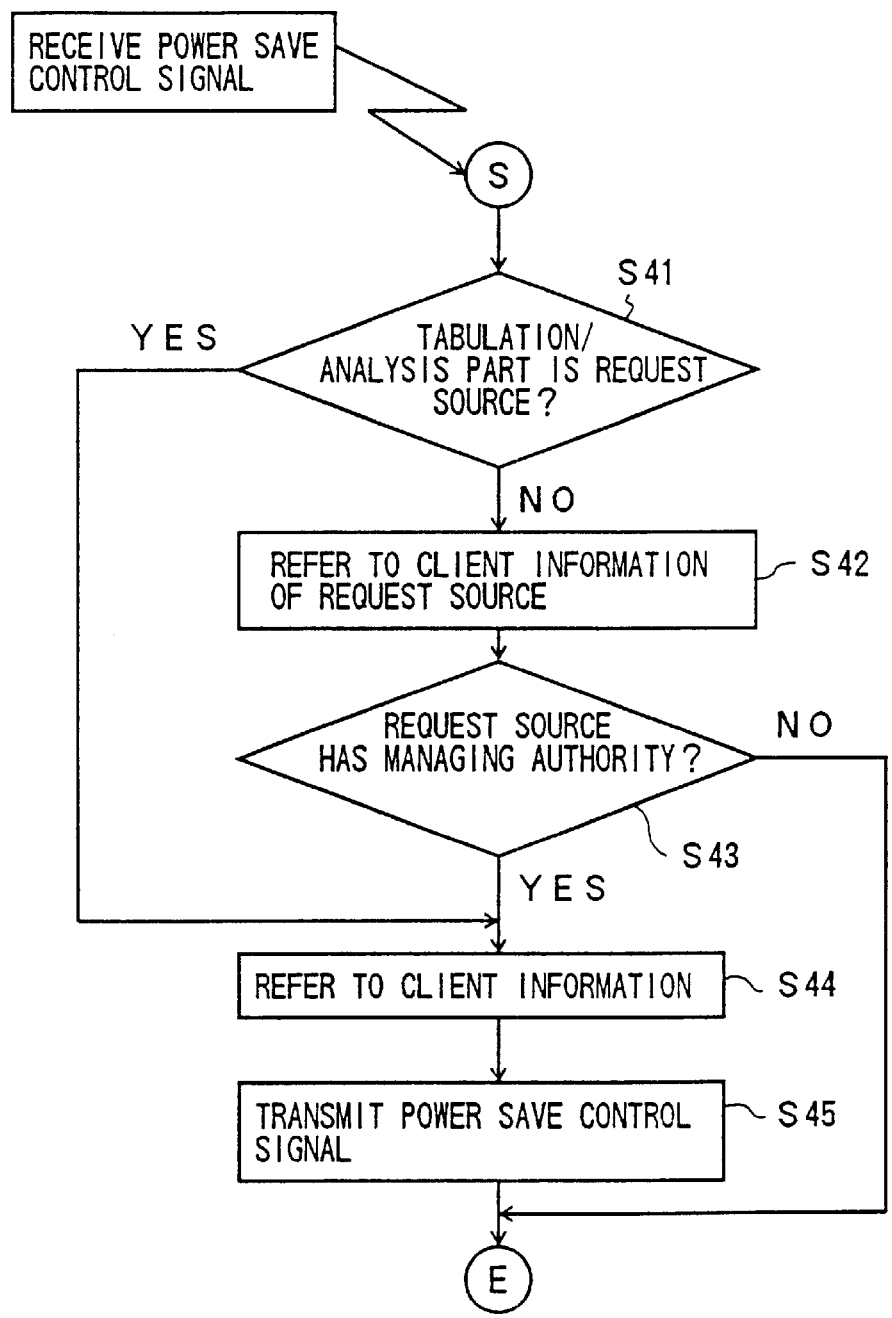
FIG. 13 is a flow chart for explaining the operation of the CPU for realizing the function of the control signal transmitting part in the second embodiment.

FIG. 13 is a flow chart for explaining the operation of the CPU 42 for realizing the function of the control signal transmitting part 52 of the personal computer 31. The process shown in FIG. 13 is started when the control signal transmitting part 52 of the personal computer 31 receives the power save control request. A step S41 decides whether or not the request source of the power save control request is the tabulation/analysis part 53 of the personal computer 31, and the process advances to a step S44 which will be described later if the decision result in the step S41 is YES. On the other hand, if the decision result in the step S41 is NO, a step S42 makes a reference to the client information of the personal computer 32 which is the request source of the power save control request in the schedule which is made up of the tables shown in FIGS. 7 and 8 and stored in the member structure/schedule storage part 51. A step S43 decides whether or not the personal computer 32 which is the request source has the managing authority with respect to the personal computer 31, based on the management level information table shown in FIG. 8. The process ends if the decision result in the step S43 is NO. If the decision result in the step S43 is YES, the step S44 makes a reference to the client information (client ID number) of the personal computer 32 which is the request source in the client information table shown in FIG. 7 of the schedule. In addition, if the decision result in the step S41 is YES, the step S44 makes a reference to the client information (client ID number) of the personal computer 32 which needs to be subject to the power save control in the client information table shown in FIG. 7. A step S45 outputs to the network 33 the power save control signal with respect to the personal computer 32 which made the power save control request or is set with the power save control request, and the process ends.

Accordingly, it is possible to transmit the power save control signal in both cases where the power save control request is made from the tabulation/analysis part 53 of the personal computer 31 and where the power save control request is made from the personal computer 32 which has a specific managing authority with respect to the personal computer 31.

Figure 14:
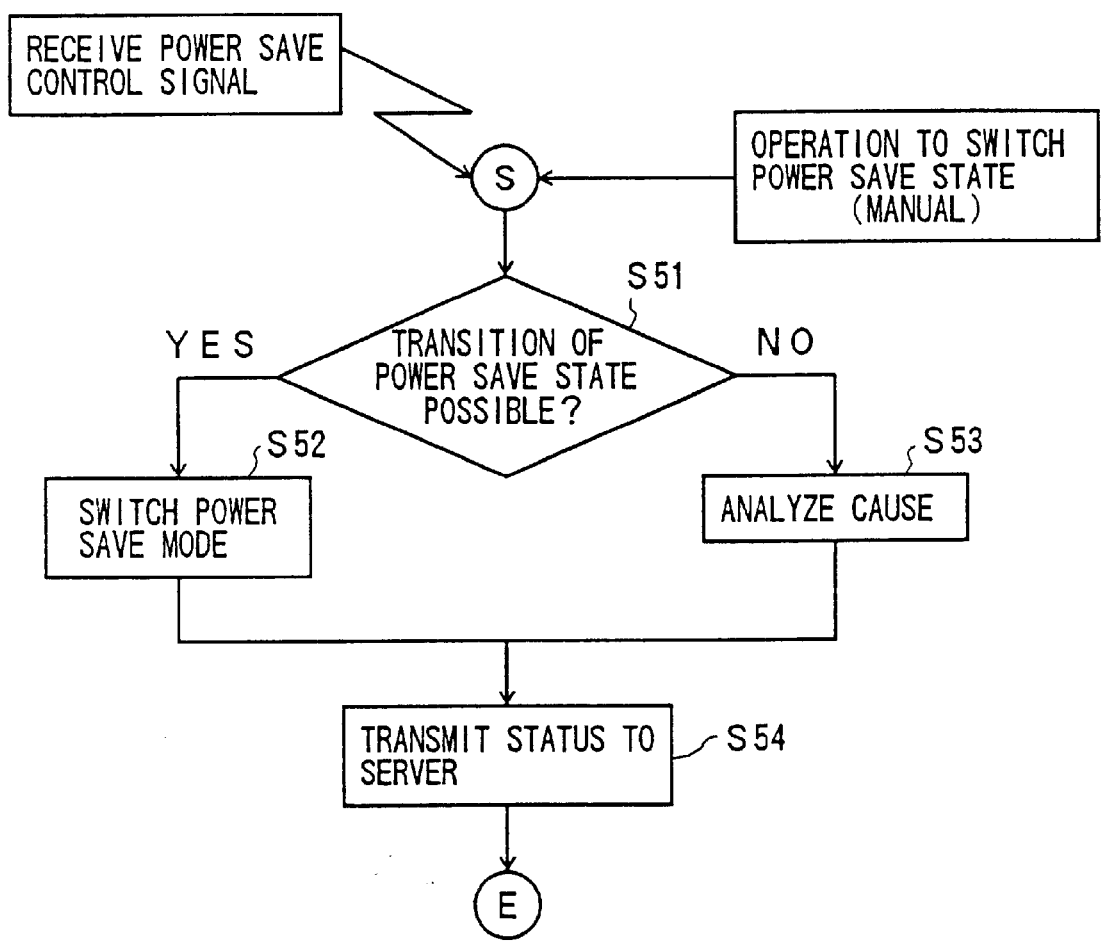
FIG. 14 is a flow chart for explaining the operation of the CPU for realizing the functions of a power save mode control part and a notifying part in the second embodiment.

FIG. 14 is a flow chart for explaining the operation of the CPU 42 for realizing the functions of the power save mode control part 62 and the notifying part 63 of the personal computer 32. The process shown in FIG. 14 is started when the power save control signal with respect to the personal computer 32 is received via the network 33 or, an operation to switch the operation mode to the power save mode is manually carried out at the personal computer 32. A step S51 decides whether or not a transition to the power save mode is possible depending on the operating state and the like of the personal computer 32. If the decision result in the step S41 is YES, a step S52 carries out the transition to the power save mode by a known method, and the process advances to a step S54. On the other hand, if the decision result in the step S51 is NO, a step S53 analyzes the cause for not being able to make the transition to the power save mode by a known method, and the process advances to the step S54. The step S54 outputs, as status information, the result of the transition to the power save mode in the step S52 or the result of the analysis of the cause in the step S53, and the status information is output from the notifying part 63 to the personal computer 31 via the network 33.

Accordingly, the status information indicating the result of the transition to the power save mode is notified to the personal computer 31 if, the transition to the power save mode is possible. In addition, the status information indicating the result of the analysis of the cause is notified to the personal computer 31 if the transition to the power save mode is not possible.

Figure 15:
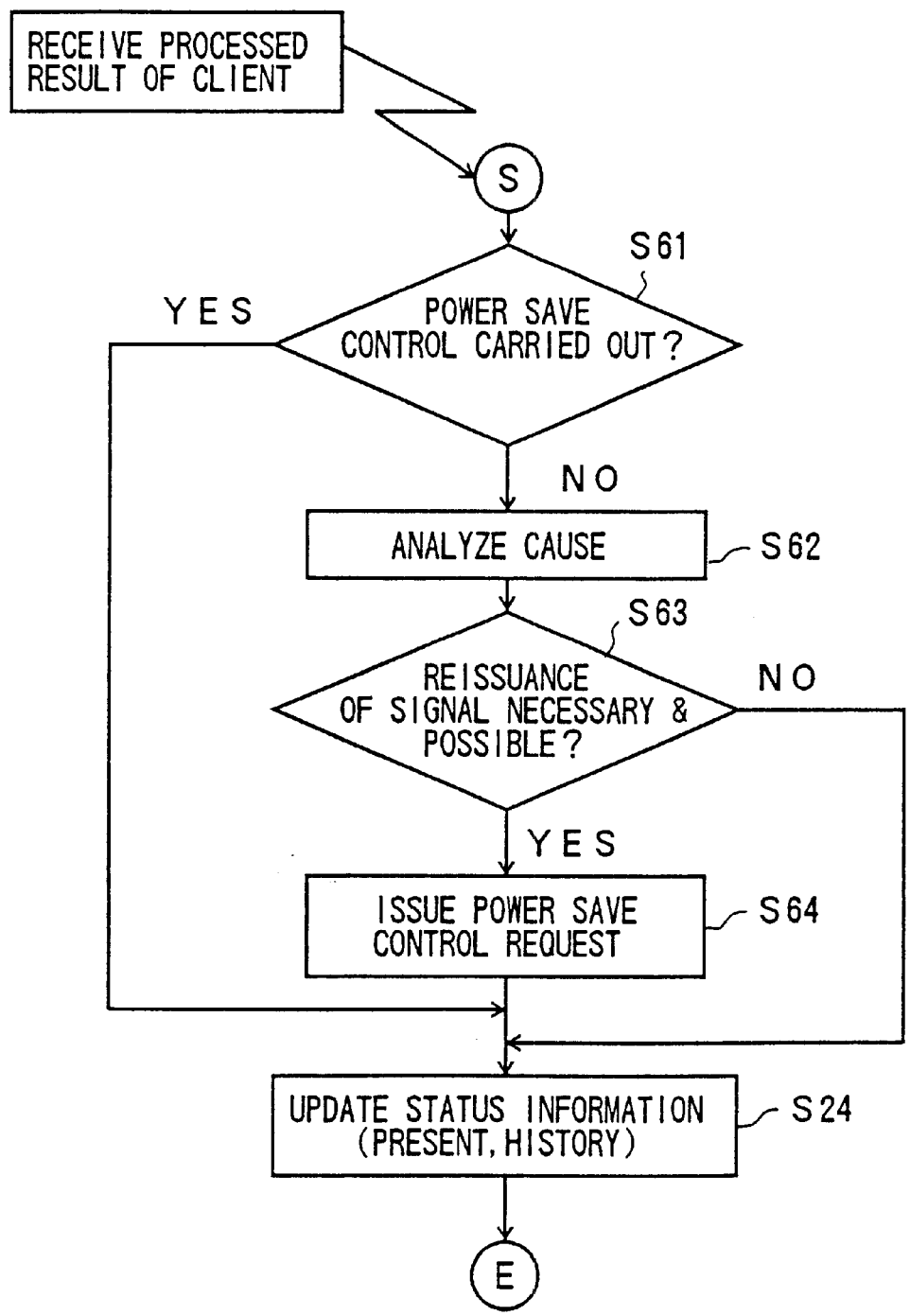
FIG. 15 is a flow chart for explaining the operation of the CPU for realizing the function of a tabulation/analysis part in the second embodiment.

FIG. 15 is a flow chart for explaining the operation of the CPU 42 for realizing the function of the tabulation/analysis part 53 of the personal computer 31. The process shown in FIG. 15 is started when the tabulation/analysis part 53 of the personal computer 31 receives the status information from the personal computer 32. A step S61 decides whether or not the power save control is carried out in the personal computer 32, based on the status information. The process advances to a step S65 which will be described later if the decision result in the step S61 is YES. On the other hand, if the decision result in the step S61 is NO, a step S62 analyzes the cause of the power save control not being carried out, based on the status information. A step S63 decides whether or not the reissuance of the power save control signal is necessary and possible, based on the result of the analysis of the cause in the step S62. If the decision result in the step S63 is NO, the process advances to a step,S65 which will be described later. If the decision result in the step S63 is YES, the step S64 makes the power save control request again with respect to the control signal transmitting part 52, so as to have the power save control signal reissued. The step S65 updates the contents of the client status history table shown in FIG. 11 based on the status information, and the process ends.

Accordingly, it is possible to make the control signal transmitting part 52 reissue the power save control signal if the reissuance of the power save control signal is necessary. In addition, it is possible to centrally manage the history of each of the personal computers 32 at the personal computer 31, by updating the contents of the client status history table based on the status information.

Figure 16:
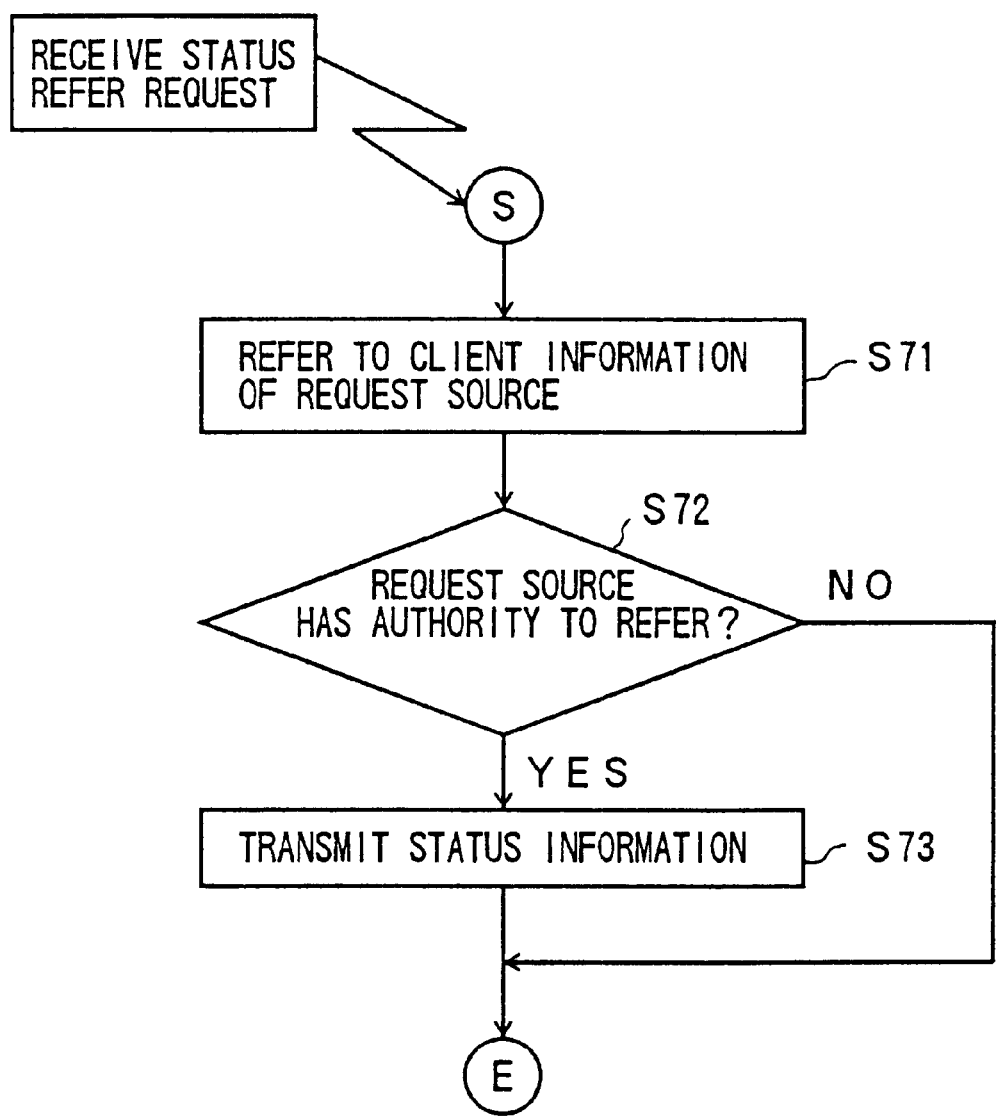
FIG. 16 is a flow chart for explaining the operation of the CPU for realizing the function of the tabulation/analysis part in the second embodiment.

FIG. 16 is a flow chart for explaining the operation of the CPU 42 for realizing the function of the tabulation/analysis part 53 of the personal computer 31. The process shown in FIG. 16 is started when the tabulation/analysis part 53 of the personal computer 31 receives a status refer request from a personal computer 32 which has a specific authority to make reference to the status information. A step S71 makes reference to the client information of the personal computer 32 which is the request source of the status refer request, in the schedule which is made up of the tables shown in FIGS. 7 and 8 and stored in the member structure/schedule storage part 51. A step S72 decides whether or not the personal computer 32 which is the request source has the authority to make reference to the status information managed by the personal computer 31, based on the management level information table shown in FIG. 8. The process ends if the decision result in the step S72 is NO. On the other hand, if the decision result in the step S72 is YES, a step S73 reads from the client status history table shown in FIG. 11 the status information requested by the personal computer 32 which is the request source, and transmits the read status information to the network 33. The process ends after the step S73.

Accordingly, when the status refer request which requests reference to the status information centrally managed by the personal computer 31 is received from the personal computer 32 which has the specific authority to make reference to the status information, it is possible to transmit the requested status information to this personal computer 32.

A plurality of power save levels may be set for the power save mode. In this case, parts of the information processing apparatus to be maintained to a state which enables instantaneous starting depends upon the power save level. For example, in a case where the storage unit 44 shown in FIG. 3 is made of a magnetic disk drive, a motor which rotates a magnetic disk within the magnetic disk drive is driven in a power save level L1, but this motor is stopped in a power save level L2 (L2>L1) so as to further reduce the power consumption. Information which indicates such a power save level may be included within the power save control signal output from the personal computer 31. In response to the power save control signal which includes such information indicating the power save level, the personal computer 32 may switch the operation mode to a power save level indicated by the power save control signal depending on the present operating state or, if this is impossible, successively switch to a power save level which reduces the power consumption as much as possible depending on the operating state until it becomes possible to switch to-the power save level indicated by the power save control signal.

Next, a description will be given of a third embodiment of the power save function remote control method according to the present invention. The general construction of the computer system to which his third embodiment of the power save function remote control method is applied is the same as that of the first embodiment described above. In addition, the general construction of the personal computers may be the same as that shown in FIG. 3. In this third embodiment of the power save function remote control method, the present invention is applied to the computer system, and a third embodiment of the information processing apparatus according to the present invention and a third embodiment of the storage medium according to the present invention are employed.

In this embodiment, it is possible to carry out the control in units of the power save levels, in addition to realizing the functions of the first or second embodiment described above. The personal computer 31 manages the schedule which includes the power save level described above, and outputs the power save control signal by including the information indicating the power save level.

Figure 17:
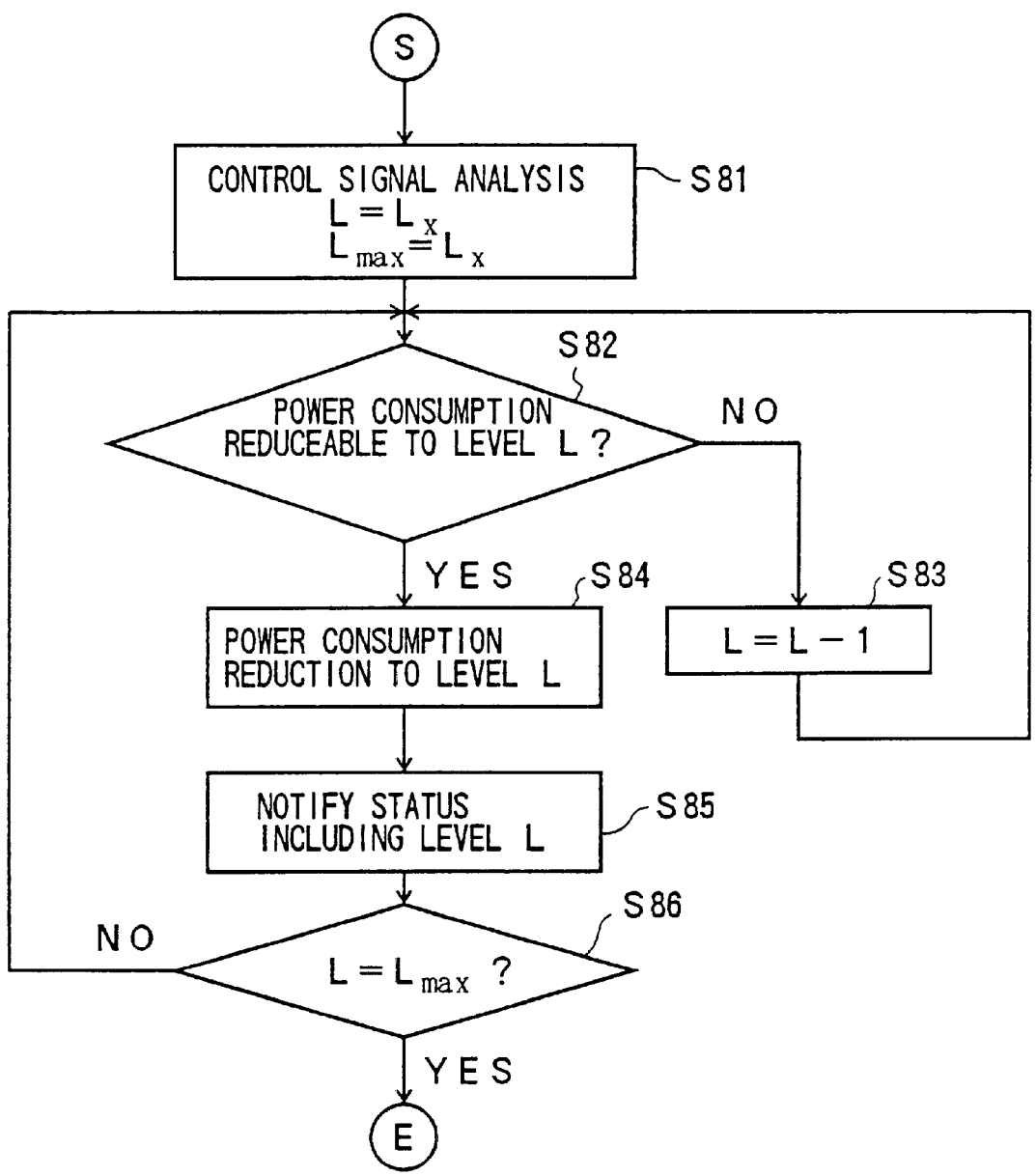
FIG. 17 is a flow chart for explaining the operation of the CPU for realizing the function of a power save mode control part of a third embodiment.

FIG. 17 is a flow chart for explaining the operation of the CPU 42 for realizing the function of the power save mode control part 62 of the personal computer 32. The process shown in FIG. 17 is started when the power save mode control part 62 of the personal computer 32 receives via the network 33 the power save control signal which is output from the control signal transmitting part 52 of the personal computer 31 and includes the information indicating the power save level.

In FIG. 17, a step S81 analyzes the power save control signal received from the personal computer 31, and discriminates a requested power save level Lx. The step S81 further sets an initial power save level L to O=Lx, and sets a maximum power save level Lmax to Lmax=Lx. A step S82 decides whether or not it is possible to reduce the power consumption to the power save level L, depending on the operating state of the personal computer 32. If the decision result in the step S82 is NO, a step S83 decrements the power save level L by 1, and the process returns to the step S82. On the other hand, if the decision result in the step S82 is YES, a step S84 reduces the power consumption to the power save level L, ad a step S85 makes the notifying part 63 return the status information which includes the power save level L to the personal computer 31. A step S86 decides whether or not the present power save level L is L=Lmax. If the decision result in the step S86 is NO, the steps S82 through S86 are repeated until the power consumption can be reduced to the requested power save level Lx. The process ends if the decision result in the step S86 is YES.

Therefore, according to the present invention, it is possible to remotely control the power save mode by centrally managing and controlling the setting and management of the power save mode of each information processing apparatus, so that the information processing system can be utilized efficiently from the point of the power consumption.

Further, the present invention is not limited to these embodiments, but various variations and modifications may be made without departing from the scope of the present invention.

What is claimed is:

1. A power save function remote control method for a system having a first information processing apparatus and at least one second information processing apparatus which are coupled via a network, said remote control method comprising:
   a first step outputting a control signal which instructs a power save mode from the first information processing apparatus to the network; and
   a second step switching the second information processing apparatus to the power save mode in response to the control signal when a predetermined condition is satisfied in the second information processing apparatus.

2. The power save function remote control method as claimed in claim 1, which further comprises:

a third step notifying, to the first information processing apparatus, status information related to a state of the second information processing apparatus including whether or not the second information processing apparatus switched to the power save mode.

3. The power save function remote control method as claimed in claim 2, which further comprises:

a fourth step outputting again the control signal depending on the status information received by the first information processing apparatus.

4. The power save function remote control method as claimed in claim 1, wherein the power save mode comprises a plurality of power save levels, and said second step switches the second information processing apparatus to a power save level corresponding to the condition satisfied in the second information processing apparatus.

5. The power save function remote control method as claimed in claim 4, wherein said second step successively switches the power save level of the power save mode depending on the condition satisfied in the second information processing apparatus until a condition corresponding to a power save level indicated by the control signal is satisfied in the second information processing apparatus.

6. The power save function remote control method as claimed in claim 1, wherein said first step outputs the control signal to the network based on a schedule which is preset with respect to an arbitrary second information processing apparatus.

7. The power save function remote control method as claimed in claim 6, which further comprises:

a step setting the schedule from the first information processing apparatus or the arbitrary second information processing apparatus.

8. The power save function remote control method as claimed in claim 1, which further comprises:

a step centrally managing status information related to a plurality of second information processing apparatuses in the first information processing apparatus.

9. An information processing apparatus connectable to a network, comprising:

a power save controller outputting a control signal which instructs a power save mode to the network; and a manager inputting, via the network, status information related to states of other information processing apparatuses including whether or not the other information processing apparatuses switched to a power save mode, and centrally managing the status information related to the other information processing apparatuses.

10. The information processing apparatus as claimed in claim 9, wherein said power save controller outputs the control signal to the network based on a schedule which is preset with respect to an arbitrary one of the other information processing apparatuses.

11. The information processing apparatus as claimed in claim 10, which further comprises:

means for setting the schedule.

12. An information processing apparatus connectable to a network, comprising:

a power save mode controller switching an operation mode thereof to a power save mode in response to a control signal input via the network when a predetermined condition is satisfied; and a status output part outputting, to the network, status information related to a state of the information processing apparatus including whether or not the operation mode is switched to the power save mode.

13. The information processing apparatus as claimed in claim 12, wherein the power save mode comprises a plurality of power save levels, and said power save mode controller switches the operation mode thereof to a power save level of the power save mode corresponding to a condition satisfied in the information processing apparatus.

14. The information processing apparatus as claimed in claim 13, wherein said power save mode controller successively switches the power save level of the power save mode depending on the condition satisfied in the information processing apparatus until a condition corresponding to a power save level indicated by the control signal is satisfied in the information processing apparatus.

15. A computer readable storage medium which stores a program for controlling an information processing apparatus coupled to a network, comprising:

power save control means for causing the information processing apparatus to output a control signal which instructs a power save mode to the network; and managing means for causing the information processing apparatus to input, via the network, status information related to states of other information processing apparatuses including whether or not the other information processing apparatuses switched to a power save mode, and centrally managing the status information related to the other information processing apparatuses.

16. The computer readable storage medium as claimed in claim 15, wherein said power save control means causes the information processing apparatus to output the control signal to the network based on a schedule which is preset with respect to an arbitrary one of the other information processing apparatuses.

17. The computer readable storage medium as claimed in claim 16, which further comprises:

means for causing the information processing apparatus to set the schedule.

18. A computer readable storage medium which stores a program for controlling an information processing apparatus coupled to a network, comprising:

power save mode control means for causing the information processing apparatus to switch an operation mode thereof to a power save mode in response to a control signal input via the network when a predetermined condition is satisfied; and status output means for causing the information processing apparatus to output, to the network, status information related to a state of the information processing apparatus including whether or not the operation mode is switched to the power save mode.

19. The computer readable storage medium as claimed in claim 18, wherein the power save mode comprises a plurality of power save levels, and said power save mode control means causes the information processing apparatus to switch the operation mode thereof to a power save level of the power save mode corresponding to a condition satisfied in the information processing apparatus.

20. The computer readable storage medium as claimed in claim 19, wherein said power save mode control means causes the information processing apparatus to successively switch the power save level of the power save mode depending on the condition satisfied in the information processing apparatus until a condition corresponding to a power save level indicated by the control signal is satisfied in the information processing apparatus.

21. A method comprising:

outputting a control signal which instructs a power save mode from a first information processing apparatus to a network; and switching a second information processing apparatus to the power save mode in response to the control signal when a predetermined condition is satisfied in the second information processing apparatus.

22. A method as claimed in claim 21, which further comprises:

notifying to the first information processing apparatus status information related to a state of the second information processing apparatus including whether or not the second information processing apparatus switched to the power save mode.

23. A method as claimed in claim 22, which further comprises:

outputting again the control signal depending on the status information received by the first information processing apparatus.

24. A method as claimed in claim 21, wherein the power save mode comprises a plurality of power save levels, and said switching switches the second information processing apparatus to a power save level corresponding to the condition satisfied in the second information processing apparatus.

25. A method as claimed in claim 24, wherein said switching successively switches the power save level of the power save mode depending on the condition satisfied in the second information processing apparatus until a condition corresponding to a power save level indicated by the control signal is satisfied in the second information processing apparatus.

26. A method as claimed in claim 21, wherein said outputting outputs the control signal to the network based on a schedule which is preset with respect to an arbitrary second information processing apparatus.

27. A method as claimed in claim 26, which further comprises:

setting the schedule from the first information processing apparatus or the arbitrary second information processing apparatus.

28. A method as claimed in claim 21, which further comprises:

centrally managing status information related to a plurality of second information processing apparatuses in the first information processing apparatus.

29. A computer readable storage medium which stores a program for controlling an information processing apparatus coupled to a network, comprising:

a power save control causing the information processing apparatus to output a control signal which instructs a power save mode to the network; and a manager causing the information processing apparatus to input, via the network, status information related to states of other information processing apparatuses including whether or not the other information processing apparatuses switched to a power save mode, and centrally managing the status information related to the other information processing apparatuses.

30. A computer readable storage medium as claimed in claim 29, wherein said power save control causes the information processing apparatus to output the control signal to the network based on a schedule which is preset with respect to an arbitrary one of the other information processing apparatuses.

31. A computer readable storage medium as claimed in claim 30, which further comprises:

causing the information processing apparatus to set the schedule.

32. A computer readable storage medium which stores a program for controlling an information processing apparatus coupled to a network, comprising:

power save mode control causing the information processing apparatus to switch an operation mode thereof to a power save mode in response to a control signal input via the network when a predetermined condition is satisfied; and a status output causing the information processing apparatus to output, to the network, status information related to a state of the information processing apparatus including whether or not the operation mode is switched to the power save mode.

33. A computer readable storage medium as claimed in claim 32, wherein the power save mode comprises a plurality of power save levels, and said power save mode control causes the information processing apparatus to switch the operation mode thereof to a power save level of the power save mode corresponding to a condition satisfied in the information processing apparatus.

34. A computer readable storage medium as claimed in claim 33, wherein said power save mode control causes the information processing apparatus to successively switch the power save level of the power save mode depending on the condition satisfied in the information processing apparatus until a condition corresponding to a power save level indicated by the control signal is satisfied in the information processing apparatus.

35. A method comprising:

outputting a control signal which instructs a power save mode from a server-computer to a network; and switching a client-computer to the power save mode in response to the control signal when a predetermined condition is satisfied in the client-computer.

36. A method as claimed in claim 35, which further comprises:

notifying to the server-computer status information related to a state of the client-computer including whether or not the client-computer switched to the power save mode.

37. A method as claimed in claim 36, which further comprises:

outputting again the control signal depending on the status information received by the server-computer.

38. A method as claimed in claim 35, wherein the power save mode comprises a plurality of power save levels, and said switching switches the client-computer to a power save level corresponding to the condition satisfied in the client-computer.

39. A method as claimed in claim 38, wherein said switching successively switches the power save level of the power save mode depending on the condition satisfied in the client-computer until a condition corresponding to a power save level indicated by the control signal is satisfied in the client-computer.

40. A method as claimed in claim 35, wherein said outputting outputs the control signal to the network based on a schedule which is preset with respect to an arbitrary client-computer.

41. A method as claimed in claim 40, which further comprises:
   setting the schedule from the server-computer or the arbitrary client-computer.

42. A method as claimed in claim 35, which further comprises:
   centrally managing status information related to a plurality of client-computer in the server-computer.

43. A computer readable storage medium which stores a program for controlling an server-computer coupled to a network, comprising:
   a power save control causing the server-computer to output a control signal which instructs a power save mode to the network; and
   a manager causing the server-computer to input, via the network, status information related to states of client-computers including whether or not the client-computers switched to a power save mode, and centrally managing the status information related to the client-computers.

44. A computer readable storage medium as claimed in claim 43, wherein said power save control causes the server-computer to output the control signal to the network based on a schedule which is preset with respect to an arbitrary one of the client-computers.

45. A computer readable storage medium as claimed in claim 44, which further comprises:
   causing the server-computer to set the schedule.

46. A computer readable storage medium which stores a program for controlling an client-computer coupled to a network, comprising:
   power save mode control causing the client-computer to switch an operation mode thereof to a power save mode in response to a control signal input via the network when a predetermined condition is satisfied; and
   a status output causing the client-computer to output, to the network, status information related to a state of the client-computer including whether or not the operation mode is switched to the power save mode.

47. A computer readable storage medium as claimed in claim 46, wherein the power save mode comprises a plurality of power save levels, and said power save mode control causes the client-computer to switch the operation mode thereof to a power save level of the power save mode corresponding to a condition satisfied in the client-computer.

48. A computer readable storage medium as claimed in claim 47, wherein said power save mode control causes the client-computer to successively switch the power save level of the power save mode depending on the condition satisfied in the client-computer until a condition corresponding to a power save level indicated by the control signal is satisfied in the client-computer.

* * * * *

UNITED STATES PATENT AND TRADEMARK OFFICE
CERTIFICATE OF CORRECTION

PATENT NO.    : 6,408,395 B1
DATED         : June 18, 2002
INVENTOR(S)   : Yasuo Sugahara et al.

It is certified that error appears in the above-identified patent and that said Letters Patent is hereby corrected as shown below:

<u>Title page,</u>
Item [56], References Cited, FOREIGN PATENT DOCUMENTS, please insert:
--      EP 0777172A1   04/1997   Europe
        EP 0735455A2   02/1996   Europe --

Signed and Sealed this

Twenty-second Day of October, 2002

*Attest:*

*Attesting Officer*

JAMES E. ROGAN
*Director of the United States Patent and Trademark Office*